United States Patent
Kennedy

[11] Patent Number: 6,148,529
[45] Date of Patent: Nov. 21, 2000

[54] MULTIPURPOSE RETRACTABLE LEVELING DEVICE

[76] Inventor: Seamus Kennedy, Apt. D., 417 13th St., Huntington Beach, Calif. 92648

[21] Appl. No.: 09/003,663

[22] Filed: Jan. 7, 1998

[51] Int. Cl.[7] ..................................................... G01C 9/26
[52] U.S. Cl. ............................................... 33/374; 33/369
[58] Field of Search ............................... 33/369, 374, 375, 33/379, 381, DIG. 1

[56] References Cited

U.S. PATENT DOCUMENTS

| | | | |
|---|---|---|---|
| 1,624,684 | 4/1927 | Smith | 33/369 |
| 2,680,302 | 6/1954 | Standal | 33/369 |
| 4,189,844 | 2/1980 | Riggins, Sr. | 33/374 |
| 4,607,437 | 8/1986 | McSorley, Sr. et al. | 33/374 |
| 4,745,689 | 5/1988 | Hiltz | 33/DIG. 1 |
| 5,412,875 | 5/1995 | Hilderbrandt | 33/374 |
| 5,577,327 | 11/1996 | Archambault | 33/374 |

*Primary Examiner*—G. Bradley Bennett

[57] ABSTRACT

A multipurpose retractable leveling device including a pair of side housings each having a generally rectangular configuration. A central level portion is positioned between the pair of side housings. The central level portion is defined by a rectangular housing with a vertically oriented spirit level and a horizontally oriented spirit level. A pair of strings have first ends secured to a first side housing with the strings extending through the central level portion with second ends of the pair of strings extending inwardly of a second side housing whereby the central level portion is slidably disposed on the pair of strings. A locking retractable spool is disposed within the second side housing for engaging the second ends of the pair of strings.

1 Claim, 2 Drawing Sheets

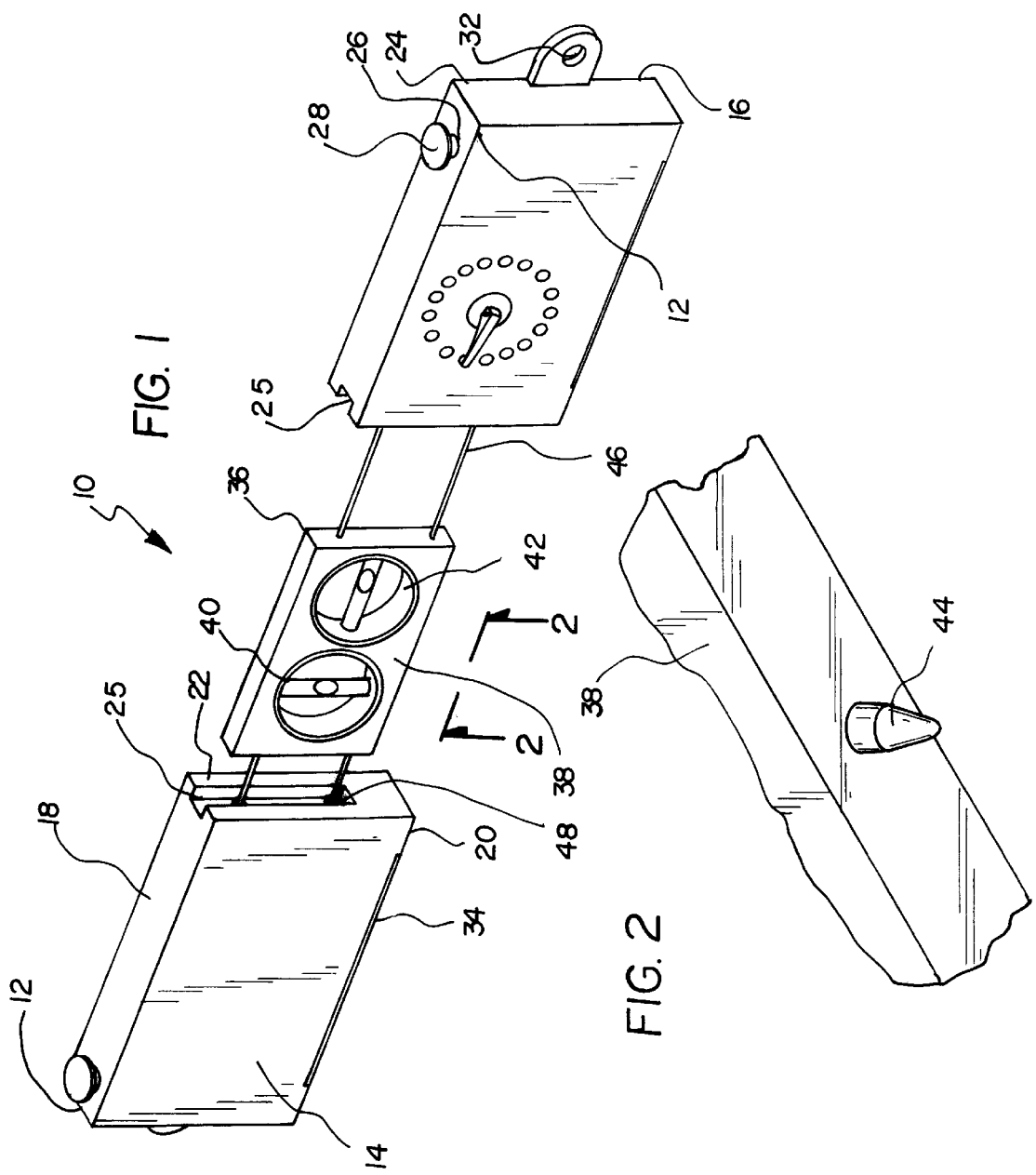

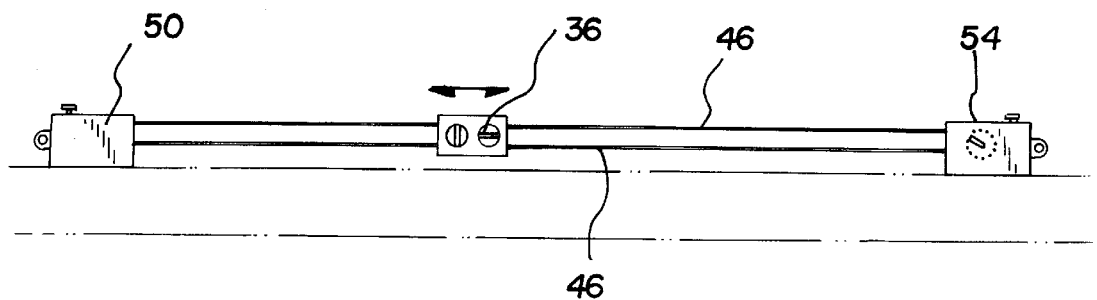
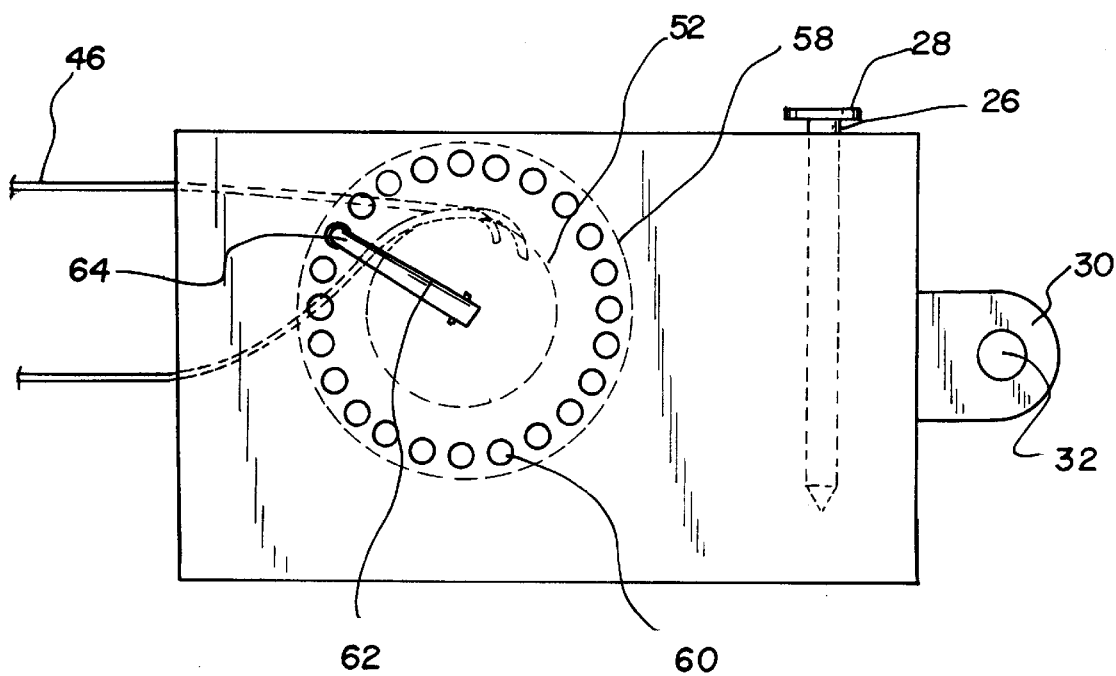

MULTIPURPOSE RETRACTABLE LEVELING DEVICE

BACKGROUND OF THE INVENTION

1. Field of the Invention

The present invention relates to a multipurpose retractable leveling device and more particularly pertains to providing a leveling device that can be used for other purposes with a multipurpose retractable leveling device.

2. Description of the Prior Art

The use of extendable levels is known in the prior art. More specifically, extendable levels heretofore devised and utilized for the purpose of determining a level surface are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,433,011 to Scarborough et al.; U.S. Pat. No. 4,894,925 to Langmaid; U.S. Pat. No. 4,607,437 to McSlorley, Sr. et al.; U.S. Pat. No. 4,130,943 to Talbot; U.S. Pat. No. 5,412,875 to Hilderbrandt; and U.S. Pat. No. 4,862,595 to Drumright.

While these devices fulfill their respective, particular objective and requirements, the aforementioned patents do not describe a multipurpose retractable leveling device for providing a leveling device that can be used for other purposes.

In this respect, the multipurpose retractable leveling device according to the present invention substantially departs from the conventional concepts and designs of the prior art, and in doing so provides an apparatus primarily developed for the purpose of providing a leveling device that can be used for other purposes.

Therefore, it can be appreciated that there exists a continuing need for new and improved multipurpose retractable leveling device which can be used for providing a leveling device that can be used for other purposes. In this regard, the present invention substantially fulfills this need.

SUMMARY OF THE INVENTION

In the view of the foregoing disadvantages inherent in the known types of extendable levels now present in the prior art, the present invention provides an improved multipurpose retractable leveling device. As such, the general purpose of the present invention, which will be described subsequently in greater detail, is to provide a new and improved multipurpose retractable leveling device and method which has all the advantages of the prior art and none of the disadvantages.

To attain this, the present invention essentially comprises a pair of side housings each having a generally rectangular configuration. Each of the housings is defined by a front face, a rear face, a top edge, a bottom edge, an inner edge and an outer edge. Each inner edge has a recess formed therein. Each top edge has an aperture therethrough for removably receiving a nail therein. Each outer edge has a tab extending outwardly therefrom. Each tab has an aperture therethrough. Each bottom edge has a magnet disposed thereon. A central level portion is positioned between the pair of side housings. The central level portion is defined by a rectangular housing with a vertically oriented spirit level and a horizontally oriented spirit level. The housing has opposed side edges for being received within the recesses of the pair of side housings in a retracted orientation. The central level portion has a slidable pointer extendable downwardly from a lower edge thereof. A pair of strings are provided with each having a predetermined length. The pair of strings have first ends secured to the recess of a first side housing with the strings extending through the central level portion with second ends of the pair of strings extending inwardly of the recess of a second side housing whereby the central level portion is slidably disposed on the pair of strings. A locking retractable spool is disposed within the second side housing. The locking retractable spool engages the second ends of the pair of strings. The second housing has a plurality of apertures therein arranged in a circular configuration. A pivotable locking handle is secured to the second housing within the plurality of apertures and is secured to the spool for rotation thereof. The pivotable locking handle has a free end selectively extending through one of the plurality of apertures for engaging the spool to preclude rotation thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended her etc.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construct insofar as they do not depart from the spirit and scope of the present invention.

It is therefore an object of the present invention to provide a new and improved multipurpose retractable leveling device which has all the advantages of the prior art extendable levels and none of the disadvantages.

It is another object of the present invention to provide a new and improved multipurpose retractable leveling device which may be easily and efficiently manufactured and marketed.

It is a further object of the present invention to provide a new and improved multipurpose retractable leveling device which is of durable and reliable construction.

An even further object of the present invention is to provide a new and improved multipurpose retractable leveling device which is susceptible of a low cost of manufacture with regard to both materials and labor, and which accordingly is then susceptible of low prices of sale to the consuming public, thereby making such a multipurpose retractable leveling device economically available to the buying public.

Even still another object of the present invention is to provide a new and improved multipurpose retractable leveling device for providing a leveling device that can be used for other purposes.

Lastly, it is an object of the present invention to provide a new and improved multipurpose retractable leveling device including a pair of side housings each having a generally rectangular configuration. A central level portion is positioned between the pair of side housings. The central level portion is defined by a rectangular housing with a vertically oriented spirit level and a horizontally oriented spirit level. A pair of strings have first ends secured to a first side housing with the strings extending through the central level portion with second ends of the pair of strings extending inwardly of a second side housing whereby the central level portion is slidably disposed on the pair of strings. A locking retractable spool is disposed within the second side housing for engaging the second ends of the pair of strings.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes to the annexed drawings wherein:

FIG. 1 is a perspective view of the preferred embodiment of the multipurpose retractable leveling device constructed in accordance with the principles of the present invention.

FIG. 2 is a bottom view of the level portion as taken along line 2—2 of FIG. 1.

FIG. 3 is side view of the present invention illustrated in use.

FIG. 4 is front view of the retractable wheel contained within one of the two side housings of the present invention.

The same reference numerals refer to the same parts through the various figures.

DESCRIPTION OF THE PREFERRED EMBODIMENT

With reference now to the drawings, and in particular, to FIGS. 1 through 4 thereof, the preferred embodiment of the new and improved multipurpose retractable leveling device embodying the principles and concepts of the present invention and generally designated by the reference number 10 will be described.

Specifically, it will be noted in the various Figures that the device relates to a multipurpose retractable leveling device for providing a leveling device that can be used for other purposes. In its broadest context, the device consists of a pair of side housings, a central level portion, a pair of strings and a locking retractable spool. Such components are individually configured and correlated with respect to each other so as to attain the desired objective.

The pair of side housings 12 each having a generally rectangular configuration. Each of the housings 12 is defined by a front face 14, a rear face 16, a top edge 18, a bottom edge 20, an inner edge 22 and an outer edge 24. Each inner edge 22 has a recess 25 formed therein. Each top edge 18 has an aperture 26 therethrough for removably receiving a nail 28 therein which extends through the entire housing. Each outer edge 24 has a tab 30 extending outwardly therefrom. Each tab 30 has an aperture 32 therethrough. Each bottom edge 20 has a magnet 34 disposed thereon. The nail 28 can be removed and driven through the aperture 32 in the tab 30 to secured the side housings 12 in place. The magnets 34 allow for the device to be stabilized when on a metallic surface.

The central level portion 36 is positioned between the pair of side housings 12. The central level portion 36 is defined by a rectangular housing 38 with a vertically oriented spirit level 40 and a horizontally oriented spirit level 42. The housing 38 has opposed side edges for being received within the recesses 25 of the pair of side housings 12 in a retracted orientation. The central level portion 36 has a slidable pointer 44 extendable downwardly from a lower edge thereof. The slidable pointer 44 can be used when the device 10 is used as a straight edge.

The pair of strings 46 are provided with each having a predetermined length. The strings 46 will be of a length to allow the device to measure up to ten feet in total length when fully extended. The pair of strings 46 have first ends 48 secured to the recess 25 of a first side housing 50 with the strings 46 extending through the central level portion 36 with second ends 52 of the pair of strings 46 extending inwardly of the recess 25 of a second side housing 54 whereby the central level portion 36 is slidably disposed on the pair of strings 46.

A locking retractable spool 58 is disposed within the second side housing 54. The locking retractable spool 58 engages the second ends 52 of the pair of strings 46. The second side housing 54 has a plurality of apertures 60 therein arranged in a circular configuration. A pivotable locking handle 62 is secured to the second side housing 54 within the plurality of apertures 60 and is secured to the spool 58 for rotation thereof. The pivotable locking handle 62 has a free end 64 selectively extending through one of the plurality of apertures 60 for engaging the spool 58 to preclude rotation thereof.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A multipurpose retractable leveling device for providing a leveling device that can be used for other purposes comprising:

a pair of side housings each having a generally rectangular configuration, each of the housings being defined by a front face, a rear face, a top edge, a bottom edge, an inner edge and an outer edge, each inner edge having a recess formed therein, each top edge having an aperture therethrough for removably receiving a nail therein, each nail being radially shiftable with an associated side housing and axially slidable with respect thereto, each outer edge having a tab extending outwardly therefrom, each tab having an aperture therethrough, each bottom edge having a magnet disposed thereon;

a central level portion positioned between the pair of side housings, the central level portion being defined by a rectangular housing with a vertically oriented spirit level and a horizontally oriented spirit level, the housing have opposed side edges for being received within the recesses of the pair of side housings in a retracted orientation, the central level portion having a slidable pointer extendable downwardly from a lower edge thereof;

a pair of strings each having a predetermined length, the pair of strings having first ends secured to the recess of a first side housing with the strings extending through the central level portion with second ends of the pair of strings extending inwardly of the recess of a second side housing whereby the central level portion is slidably disposed on the pair of strings; and a locking retractable spool disposed within the second side housing, the locking retractable spool engaging the second ends of the pair of strings, the second housing having a plurality of apertures therein arranged in a circular configuration, a pivotable locking handle secured to the second housing within the plurality of apertures and secured to the spool for rotation thereof, the pivotable locking handle having a free end selectively extending through one of the plurality of apertures for engaging the spool to preclude rotation thereof.

* * * * *